(12) United States Patent
Lissel et al.

(10) Patent No.: US 6,279,674 B1
(45) Date of Patent: Aug. 28, 2001

(54) ARRANGEMENT AND METHOD FOR STEERING A MOTOR VEHICLE

(75) Inventors: Ernst Lissel, Wolfsburg; Maria Binfet-Kull, Barwedel, both of (DE)

(73) Assignee: Volkswagen AG (DE)

( * ) Notice: Subject to any disclaimer, the term of this patent is extended or adjusted under 35 U.S.C. 154(b) by 203 days.

(21) Appl. No.: 08/907,965

(22) Filed: Aug. 11, 1997

(30) Foreign Application Priority Data

Aug. 9, 1996 (DE) .............................................. 196 32 251

(51) Int. Cl.[7] .................................................. B62D 5/30
(52) U.S. Cl. ........................ 180/402; 180/405; 180/6.24; 701/43
(58) Field of Search ................................... 180/402, 403, 180/404, 405, 406, 407, 411, 6.24, 6.26, 6.28, 6.3; 701/43, 76; 303/146, 147

(56) References Cited

U.S. PATENT DOCUMENTS

| | | | |
|---|---|---|---|
| 4,771,846 | 9/1988 | Venable et al. | 180/142 |
| 4,898,431 | 2/1990 | Karnopp et al. | 303/100 |
| 5,134,352 | 7/1992 | Matsumoto et al. | 318/587 |
| 5,181,173 | 1/1993 | Avitan | 364/424 |
| 5,229,944 | 7/1993 | Yasuno | 364/426 |
| 5,247,441 | 9/1993 | Serizawa et al. | 364/424 |
| 5,267,783 | 12/1993 | Inoue et al. | 303/111 |
| 5,301,617 * | 4/1994 | Miwa et al. | 180/6.24 |
| 5,344,224 * | 9/1994 | Yasuno | 303/111 |
| 5,428,532 | 6/1995 | Yasuno | 364/424 |
| 5,448,480 | 9/1995 | Rauner et al. | 364/424 |
| 5,857,754 * | 1/1999 | Fukami et al. | 701/72 |

FOREIGN PATENT DOCUMENTS

| | | |
|---|---|---|
| 2120745 | 11/1972 | (DE) . |
| 4215630 | 12/1992 | (DE) . |
| 443929 | 10/1995 | (DE) . |
| 0261325 | 3/1988 | (EP) . |
| 0275985 | 7/1988 | (EP) . |

* cited by examiner

Primary Examiner—Kevin Hurley
(74) Attorney, Agent, or Firm—Baker Botts LLP

(57) ABSTRACT

An arrangement for steering a motor vehicle having at least two steerable wheels including steering equipment for setting the position of the steerable wheels as a function of a desired steering angle signal and braking equipment which is present in the vehicle and which, in the event of a fault in the steering equipment, produces selectively different braking forces at the wheels as a function of the desired steering signal. A method for steering a motor vehicle in the event of failure of the steering equipment includes the step of applying different braking forces to the vehicle wheels in accordance with a desired steering angle signal.

21 Claims, 1 Drawing Sheet

ARRANGEMENT AND METHOD FOR STEERING A MOTOR VEHICLE

BACKGROUND OF THE INVENTION

This invention relates to arrangements for steering a motor vehicle having at least two steerable wheels which includes steering equipment for setting the position of the steerable wheels as a function of a desired steering signal and equipment for producing a steering response of the motor vehicle in the event of a fault in the steering equipment and to a method for steering a motor vehicle in which the setting of the position of the wheels in order to produce a steering response is carried out by steering equipment as a function of a desired steering signal.

In electric steering systems for motor vehicles, the so-called steer-by-wire systems, as disclosed, for example, in U.S. Pat. No. 5,247,441, are safety-critical equipment. In order to satisfy the high safety requirements for such equipment, subassemblies, for example control equipment or actuators for setting the positions of the steerable wheels, are provided in a redundant and therefore very complicated manner. Particularly in the case of electric steering systems in which the wheels are steered independently of each other and without being connected to each other, it is difficult to implement the actuators in a redundant manner for space reasons. In addition, such redundancy is also technically difficult to realize so that redundant systems are not readily available.

U.S. Pat. No. 5,134,352 discloses a vehicle steering response control device for a motor vehicle which has anti-skid braking equipment. In this system, the control equipment responds to a signal which represents the steering condition of a turning vehicle to produce a different braking force applied to the wheels lying on the inside of the curve and on the outside of the curve with the result that a yawing moment is produced between the wheels lying on the inside and on the outside, in order to support the steering of the vehicle during a braking procedure.

SUMMARY OF THE INVENTION

Accordingly, it is an object of the present invention to provide an arrangement and a method for steering a motor vehicle which overcome the disadvantages of the prior art.

Another object of the invention is to provide an arrangement and a method for steering a motor vehicle which satisfies the required safety standards and in which the use of redundant components is kept as small as possible.

These and other objects of the invention are attained by providing a braking control arrangement in which selectively different braking forces are applied to the wheels of the vehicle in response to signals representing a desired steering condition.

In accordance with the invention, therefore, braking equipment which is already present in the motor vehicle takes over the emergency function of the steering equipment thereby eliminating the necessity for redundant implementation of the actuators and control equipment for the steering system.

The equipment which takes over the emergency steering of the vehicle, is, according to the invention, braking equipment which is already present in the vehicle and which, as a function of the desired steering signal, selectively applies different braking forces to the wheels of the motor vehicle and thus, in the event of a fault in the steering equipment during a braking procedure, produces a steering response for the motor vehicle until the vehicle stops.

In order to detect the occurrence of a fault in the steering equipment, which may occur, for example, as a result of failure of individual components, provision is made for fault detection equipment which compares a desired steering signal with the position of the steerable wheels. Occurrence of a fault in the steering equipment is detected as a defined deviation of the position of at least one of the steerable wheels from the desired steering signal. The magnitude of the defined deviation is preferably dependent on the driving speed of the motor vehicle.

If an occurrence of a fault in the steering equipment is detected by the fault detection equipment, the system switches off the steering equipment. At the same time, it activates the braking equipment by applying control signals in such a way that braking forces are selectively applied to the wheels as a function of the desired steering signal to produce the steering reaction which is required by the steering equipment operated by the vehicle driver or by equipment provided for automatic guidance of the motor vehicle.

In order to be able to control the application of selective braking forces to the wheels, the instantaneous braking forces at the wheels are detected and are supplied to the braking control equipment as an actual braking parameter. For hydraulic braking equipment the braking pressures present in brake cylinders for the wheels are advantageously used as a measure of the braking forces being applied. As an alternative, the wheel speeds may be detected, from which the deceleration of each of the wheels is determined. The wheel-speed sensors which are necessary for this procedure are, for the most part, already present in motor vehicles.

The advantage of the invention is that, by using the braking equipment which is present in the vehicle to provide the emergency function of the steering equipment an increase in availability and in safety is achieved which cannot be achieved by steering equipment based on conventional redundant systems.

BRIEF DESCRIPTION OF THE DRAWINGS

Further objects and advantages of the invention will be apparent from a reading of the following description in conjunction with the accompanying drawing which is a schematic diagram illustrating a representative embodiment of a steering control arrangement in accordance with the invention.

DESCRIPTION OF PREFERRED EMBODIMENTS

Figure 1:
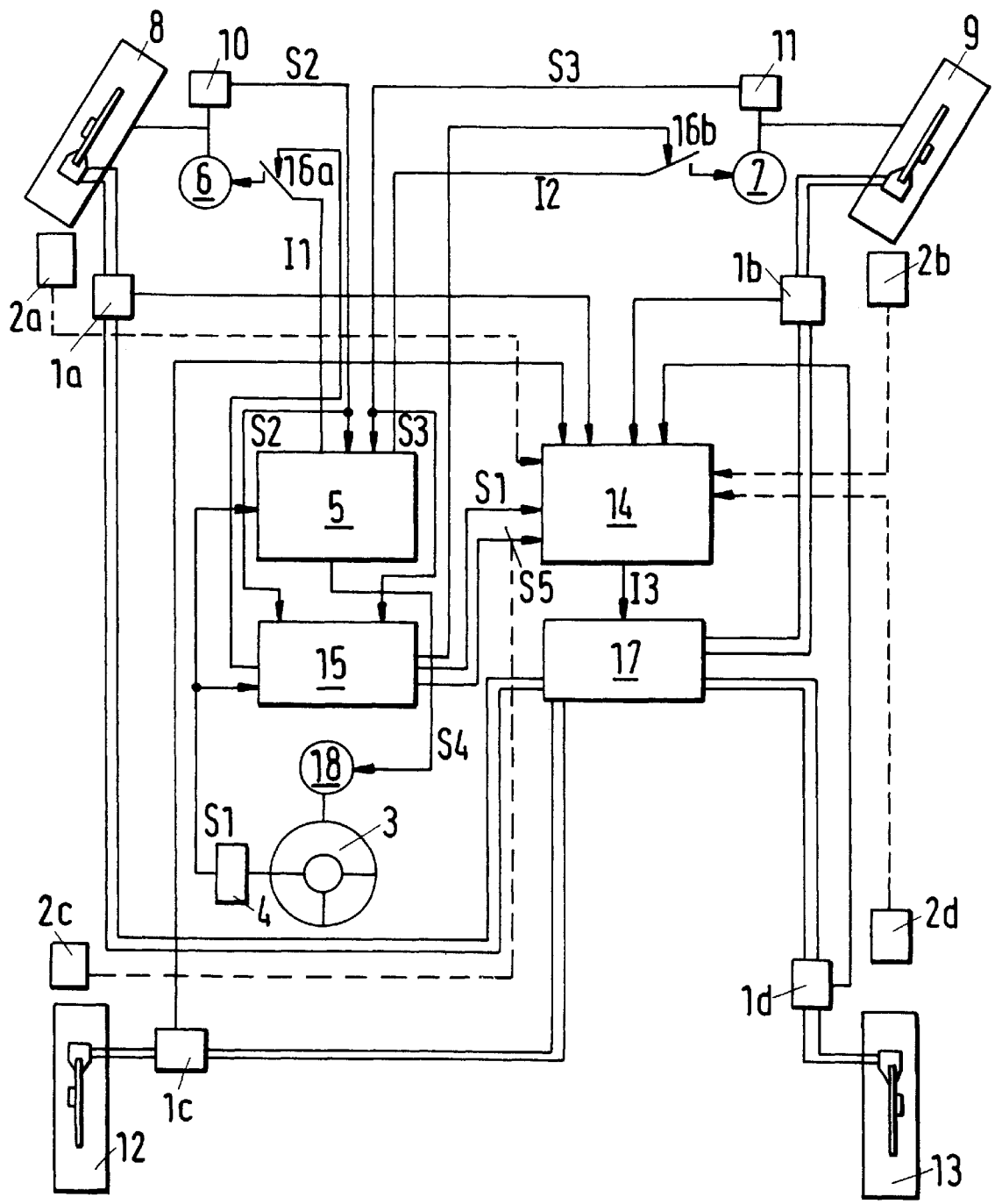

The steering control arrangement according to the invention utilizes steering equipment and braking equipment which operate completely autonomously in the normal case. In the typical embodiment shown in the drawing, the steering equipment has steering angle selection equipment in the form of a steering wheel 3 and a steering angle sensor 4 which determines, directly or indirectly, the angle of rotation of the steering wheel 3. An output signal S1 from the steering angle sensor 4 is applied to an electronic control unit 5 as the desired steering angle signal. Depending on the desired steering angle signal S1, the control unit supplies two output variables I1 and I2 to two electric actuators 6 and 7, respectively, which set the positions of two output steerable wheels 8 and 9 of the motor vehicle in order to steer the vehicle. Two wheel position sensors 10 and 11 register the instantaneous position of the steerable wheels 8 and 9, respectively, and transmit corresponding signals S2 and S3 to the control unit 5. Moreover, the control unit 5 supplies a signal S4 to an actuator 18 which transmits a steering torque feedback to the steering wheel 3 in order to produce steering feel for the driver,.

The braking equipment for the vehicle includes a control unit 14 which, during normal driving operation, obtains a braking signal as a result of the actuation of a braking pedal (not shown) and, if appropriate, from the controller for an antiskid control unit and/or a vehicle dynamics control unit. Depending on the braking signal, the control equipment transmits a brake control signal 13 to a brake actuator 17, which operates hydraulically in the exemplary embodiment, and builds up the appropriate braking pressures in the brake cylinders for the wheels, depending on the braking forces to be applied.

Furthermore, a fault detection unit 15 constantly compares the output signals S2 and S3 of the wheel position sensors 10 and 11 with the desired steering angle signal S1. If a deviation of at least one of the output signals S2 and S3 from the desired steering angle signal S1 occurs which is larger than a preset driving speed-dependent deviation value, the fault detection unit responds and opens two switches 16a and 16b which interrupt the signals to the steering actuators 6 and 7. At the same time, the fault detection unit 15 activates the control unit 14 with a control signal S5 and transmits the desired steering angle signal S1 to the unit. This produces a steering response until the motor vehicle comes to a standstill. As a function of the desired steering angle signal S1 and the actual brake signals at the wheels 8, 9, 12 and 13, the control unit 14 generates the manipulated signal I3 for the actuator 17 of the braking equipment and transmits it to the actuator in order to produce selectively different braking forces at the individual wheels.

In the case of hydraulic braking equipment, the braking pressures which are present in brake cylinders assigned to the individual wheels are detected as actual values by hydraulic pressure sensors 1a–1d.

Alternatively, the wheel speeds of the individual wheels are detected by wheel-speed sensors 2a–2d, from which the control unit 14 determines the deceleration of the individual wheels 8, 9, 12 and 13 and produces actual braking signals 3.

Although the invention has been described herein with reference to specific embodiments, many modifications and variations therein will readily occur to those skilled in the art. Accordingly, all such variations and modifications are included within the intended scope of the invention.

We claim:

1. A steering arrangement for a motor vehicle having at least two steerable wheels comprising steering control means for controlling the vehicle wheels as a function of a desired steering angle signal and braking means for producing selectively different braking forces at the vehicle wheels as a function of the desired steering angle signal in the event of a fault in steering equipment.

2. An arrangement according to claim 1 wherein the steering control means controls the steerable wheels independently of each other and the steerable wheels have no connection to each other.

3. An arrangement according to claim 1 including fault detection means for detecting the occurrence of a fault in a position of the steerable wheels by comparing the desired steering angle signal with output signals from wheel position sensors for the steerable wheels.

4. An arrangement according to claim 3 wherein the fault detection means detects the occurrence of a fault in the steering equipment based on a defined deviation of the output signals of at least one of the wheel-position sensors from the desired steering angle signal.

5. An arrangement according to claim 4 wherein the magnitude of the defined deviation is dependent upon the speed of the vehicle.

6. An arrangement according to claim 3 wherein the fault detection means, in the event of a fault in a position of the steerable wheels, switches off the steering control means and at the same time transmits a control signal to the braking means to cause the production of selectively different braking forces at the vehicle wheels as a function of the desired steering angle signal.

7. An arrangement according to claim 1 further comprising sensors for detecting braking forces which are instantaneously applied to the vehicle wheels and producing output signals for transmission to the braking means as actual braking signals.

8. An arrangement according to claim 7 wherein the braking means includes hydraulically operating brakes and the braking pressures present in brake cylinders for the hydraulically operated brakes for the wheels is detected as a measure of the braking forces being applied to the vehicle wheels.

9. An arrangement according to claim 1 including wheel speed sensors for sensing the individual speeds of the vehicle wheels and supplying output signals to the braking means and wherein the braking means determines the deceleration of the individual wheels from the output signals to produce selectively different braking forces for the individual wheels.

10. An arrangement according to claim 1 wherein the steering control means is operable by a vehicle driver and includes a steering angle sensor in order to produce the desired steering angle signal.

11. An arrangement according to claim 1 including means for generating a desired steering angle signal.

12. An arrangement according to claim 11 wherein the means for generating a desired steering angle signal includes means for driverless guidance of the motor vehicle.

13. A method for steering a motor vehicle having at least two steerable wheels wherein the setting of the position of the wheels in order to produce a steering response is carried out by steering control means as a function of a desired steering angle signal comprising:

applying selectively different braking forces to the vehicle wheels as a function of a desired steering angle to produce a steering response of the motor vehicle in the event of a fault in vehicle steering equipment.

14. A method according to claim 13 wherein the application of selectively different braking forces to the vehicle wheels is carried out using braking equipment which is present in the vehicle.

15. A method according to claim 13 including the step of detecting the occurrence of a fault in steering equipment by comparing the desired steering angle signal with the instantaneous position of at least one of the steerable wheels.

16. A method according to claim 15 including the step of detecting the occurrence of a fault in the steering equipment by the occurrence of a defined deviation of the position of at least one of the steerable wheels from the desired steering angle signal.

17. A method according to claim 16 wherein the magnitude of the defined deviation is a function of the vehicle driving speed.

18. A method according to claim 15 wherein, when an occurrence of a fault is detected in steering equipment, fault detection equipment switches off the steering equipment and, at the same time, activates the generation of selectively different braking forces in braking equipment at the vehicle wheels as a function of the desired steering angle signal.

19. A method according to claim 14 wherein a signal representing the braking forces instantaneously being applied to the wheels is supplied to the braking equipment as the actual braking force signal.

20. A method according to claim 19 wherein the braking equipment is hydraulic braking equipment and the hydraulic pressures occurring in brake cylinders assigned to the wheels are used as a measure of the braking forces being applied to the wheels.

21. A method according to claim 14 including the step of detecting the wheel speeds of the individual wheels and determining the deceleration of the wheels from the wheel speeds and supplying corresponding signals to the braking equipment.

* * * * *